United States Patent
Sakai

(10) Patent No.: US 10,868,933 B2
(45) Date of Patent: Dec. 15, 2020

(54) IMAGE PROCESSING APPARATUS, IMAGE PROCESSING SYSTEM, IMAGE PROCESSING METHOD, AND PROGRAM FOR VERIFYING AUTHORIZATION FOR IMAGE DUPLICATION

(71) Applicant: NEC CORPORATION, Tokyo (JP)

(72) Inventor: Masahito Sakai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/493,602

(22) PCT Filed: Mar. 13, 2018

(86) PCT No.: PCT/JP2018/009654
§ 371 (c)(1),
(2) Date: Sep. 12, 2019

(87) PCT Pub. No.: WO2018/168826
PCT Pub. Date: Sep. 20, 2018

(65) Prior Publication Data
US 2020/0068084 A1    Feb. 27, 2020

(30) Foreign Application Priority Data
Mar. 14, 2017 (JP) .................. 2017-048477

(51) Int. Cl.
G06K 15/00 (2006.01)
H04N 1/00 (2006.01)
G06K 9/00 (2006.01)

(52) U.S. Cl.
CPC ..... *H04N 1/00843* (2013.01); *G06K 9/00288* (2013.01); *G06K 9/00442* (2013.01);
(Continued)

(58) Field of Classification Search
None
See application file for complete search history.

(56) References Cited

U.S. PATENT DOCUMENTS 6,320,829 B1 * 11/2001 Matsumoto ........... G06T 1/0021
    369/275.3
8,238,614 B2    8/2012 Konishi
(Continued)

FOREIGN PATENT DOCUMENTS

JP    2002-368992 A    12/2002
JP    2004-023149 A     1/2004
(Continued)

OTHER PUBLICATIONS

International Search Report for PCT/JP2018/009654 dated May 22, 2018 (PCT/ISA/210).

*Primary Examiner* — Dung D Tran
(74) *Attorney, Agent, or Firm* — Sughrue Mion, PLLC

(57) ABSTRACT

An image processing apparatus includes a request processing part and a determination part. The request processing part processes a verification request for image data from a terminal. The determination part determines whether or not the image data for which verification has been requested is restricted image data whose duplication and storage have been restricted. The request processing part instructs an apparatus that stores the image data for which the verification has been requested to delete the image data for which the verification has been requested when the image data for which the verification has been requested is the restricted image data.

11 Claims, 17 Drawing Sheets

(52) U.S. Cl.
CPC ..... *H04N 1/00244* (2013.01); *H04N 1/00875* (2013.01); *G06K 2209/01* (2013.01)

(56) References Cited

U.S. PATENT DOCUMENTS

| | | | |
|---|---|---|---|
| 9,451,208 | B2 | 9/2016 | Yoshida |
| 2006/0008113 | A1 | 1/2006 | Matsukubo et al. |
| 2006/0197972 | A1* | 9/2006 | Hayashi ............ H04N 1/00846 358/1.14 |
| 2007/0097411 | A1* | 5/2007 | Kondo ............... H04N 1/00875 358/1.14 |
| 2009/0080782 | A1 | 3/2009 | Konishi |
| 2011/0188059 | A1* | 8/2011 | Kurokawa ............ G06K 15/02 358/1.9 |
| 2013/0063646 | A1 | 3/2013 | Ueno et al. |
| 2013/0182278 | A1* | 7/2013 | Tokuda ............. H04N 1/00846 358/1.14 |
| 2014/0375750 | A1 | 12/2014 | Yoshida |
| 2017/0078266 | A1* | 3/2017 | Shibayama ............ H04L 51/16 |

FOREIGN PATENT DOCUMENTS

| | | |
|---|---|---|
| JP | 2005-184743 A | 7/2005 |
| JP | 2006-025129 A | 1/2006 |
| JP | 2009-081720 A | 4/2009 |
| JP | 2009-130525 A | 6/2009 |
| JP | 2009-194439 A | 8/2009 |
| JP | 2011-248149 A | 12/2011 |
| JP | 2015-008381 A | 1/2015 |

\* cited by examiner

FIG. 11

| EXTRACTED CHARACTER STRINGS AND POSITION INFORMATION | |
|---|---|
| CHARACTER STRING | POSITION |
| INDIVIDUAL NUMBER | (X1, Y1) |
| 1234-5678-9012 | (X2, Y2) |
| NAME | (X3, Y3) |
| ... | ... |

FIG. 12

| REFERENCE INFORMATION | |
|---|---|
| CHARACTER STRING | POSITION |
| INDIVIDUAL NUMBER | (X1, Y1) |
| NAME | (X3, Y3) |
| .. | .. |

FIG. 14

| REFERENCE INFORMATION; TOKYO METROPOLIS | |
|---|---|
| CHARACTER STRING | POSITION |
| INDIVIDUAL NUMBER | (X1, Y1) |
| NAME | (X3, Y3) |
| ... | ... |

| REFERENCE INFORMATION; KANAGAWA PREFECTURE | |
|---|---|
| CHARACTER STRING | POSITION |
| INDIVIDUAL NUMBER | (X2, Y2) |
| NAME | (X5, Y5) |
| ... | ... |

...

IMAGE PROCESSING APPARATUS, IMAGE PROCESSING SYSTEM, IMAGE PROCESSING METHOD, AND PROGRAM FOR VERIFYING AUTHORIZATION FOR IMAGE DUPLICATION

CROSS-REFERENCE TO RELATED APPLICATIONS

This application is a National Stage of International Application No. PCT/JP2018/009654 filed Mar. 13, 2018 and claims the benefit of the priority of Japanese Patent Application No. 2017-048477 (filed on Mar. 14, 2017), the disclosure of which is incorporated herein in its entirety by reference.

FIELD

The present invention relates to an image processing apparatus, an image processing system, an image processing method, and a program.

BACKGROUND

In a shop that provides a rental video service or the like, an identity document is sometimes duplicated when the identity of a client is checked. As the identity document to be used on that occasion, a driver's license, a passport, an insurance card, or the like is exemplified. A "My Number Card" (individual number card) whose use has been recently started can also be used as the identity document.

A lot of people worry about duplication of identity documents including a lot of their own personal information. In consideration of the above-mentioned respect, Patent Literature 1 discloses a technology of confirming, by a client, image data that has been imaged and capturing the image data under a client's consent.

Duplication of a literary work such as a book is restricted. Patent Literature 2 discloses a technology of discarding an image including information whose reuse is prohibited.

Further, a lot of enterprises and so on worry about leakage of information including a confidential matter. In order to cope with such a problem, Patent Literatures 3 and 4 each disclose a technology of preventing output of printing data including inappropriate data or a character string that has been prohibited in advance.

[PTL 1] JP Patent Kokai Publication No. JP2015-008381A
[PTL 2] JP Patent Kokai Publication No. JP2006-025129A
[PTL 3] JP Patent Kokai Publication No. JP2004-023149A
[PTL 4] JP Patent Kokai Publication No. JP2009-130525A

SUMMARY

Each disclosure of the above-listed prior art documents is incorporated herein by reference. The following analysis has been made by the inventor of the present invention and others.

As described above, the individual number card may be used as the identity document. However, there is a restriction to duplication of an "individual number" written on the rear surface of the individual number card. Specifically, a person who can duplicate and store the individual number is limited to those prescribed by laws and regulations, such as the one in an administrative organization. In other words, if a person not prescribed by the above-mentioned laws and regulations duplicates the individual number of the individual number card (on the rear surface of the individual number card), or the like, he violates the laws and regulations.

Assume, for example, a situation where the individual number card has been presented as the identity document to a company which provides the above-mentioned rental video service when an application for membership has been made. If an employee is not completely aware of the laws and regulations, the rear surface of the individual number card on which the individual number is written may be duplicated. Such a conduct violates the laws and regulations and thereby poses a risk for the company. In a shop that provides the rental video service, there is a frequent change in staff, so that it is difficult to make a new shop staff thoroughly aware of the laws and regulations and take action in accordance with the laws and regulations.

A main object of the present invention is to provide an image processing apparatus, an image processing system, an image processing method, and a program that contribute to appropriately controlling duplication of an object whose duplication has been restricted.

According to a first aspect of the present invention, there is provided an image processing apparatus comprising:
a request processing part configured to process a verification request for image data from a terminal; and
a determination part configured to determine whether or not the image data for which verification has been requested is restricted image data whose duplication and storage have been restricted, wherein
the request processing part instructs an apparatus that stores the image data for which the verification has been requested to delete the image data for which the verification has been requested when the image data for which the verification has been requested is the restricted image data.

According to a second aspect of the present invention, there is provided an image processing system comprising:
an image processing apparatus;
a database server; and
a terminal configured to transmit a verification request about whether or not image data that the terminal has obtained is restricted image data whose duplication and storage have been restricted and to store the obtained image data in the database server, wherein
the image processing apparatus includes:
a request processing part configured to process the verification request from the terminal; and
a determination part configured to determine whether or not the image data for which verification has been requested is the restricted image data, and the request processing part instructs each of the terminal and the database server to delete the image data for which the verification has been requested when the image data for which the verification has been requested is the restricted image data.

According to a third aspect of the present invention, there is provided an image processing method comprising the steps of:
obtaining a verification request for image data from a terminal;
determining whether or not the image data for which verification has been requested is restricted image data whose duplication and storage have been restricted; and
instructing an apparatus that stores the image data for which the verification has been requested to delete the image data for which the verification has been requested when the image data for which the verification has been requested is the restricted image data.

According to a fourth aspect of the present invention, there is provided a program configured to cause a computer to execute the processes of:

obtaining a verification request for image data from a terminal; determining whether or not the image data for which verification has been requested is restricted image data whose duplication and storage have been restricted; and instructing an apparatus that stores the image data for which the verification has been requested to delete the image data for which the verification has been requested when the image data for which the verification has been requested is the restricted image data. This program can be recorded in a computer-readable storage medium. The storage medium can be set to be a non-transient (non-transient) one such as a semiconductor memory, a hard disk, a magnetic recording medium, or an optical recording medium. The present invention can also be embodied as a computer program product.

According to the respective aspects of the present invention, there are provided the image processing apparatus, the image processing system, the image processing method, and the program that contribute to appropriately controlling duplication and storage of an object whose duplication and storage have been restricted.

BRIEF DESCRIPTION OF DRAWINGS

FIG. 11 is a table for explaining operations of a character recognition part according to a second exemplary embodiment.

FIG. 12 is a table for explaining the operations of the character recognition part according to the second exemplary embodiment.

FIG. 14 includes tables for explaining the operations of the image processing server according to the third exemplary embodiment.

PREFERRED MODES

Figure 1:
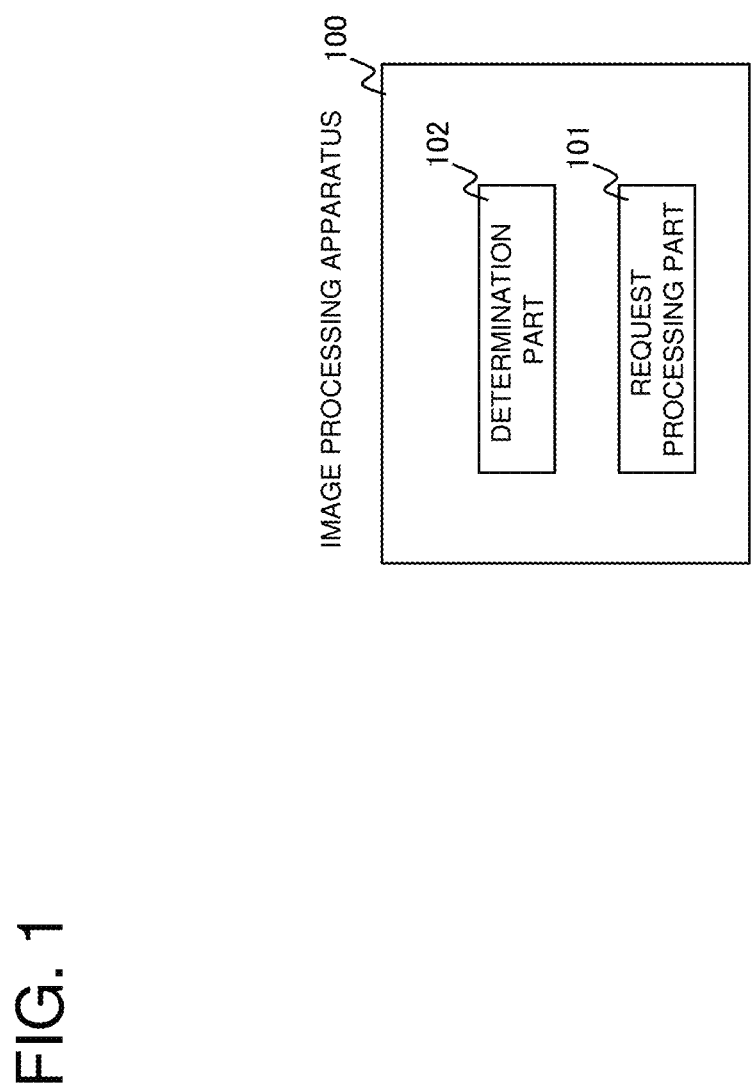
FIG. 1 is a diagram for explaining an overview of one exemplary embodiment.

First, an overview of one exemplary embodiment will be described. A reference numeral in each drawing given in this overview is provided for each element for convenience, as an example for helping understanding, and the description of this overview does not intend to impose any limitation. Connection lines between blocks in the respective drawings include bidirectional connection lines and monodirectional connection lines. Each monodirectional arrow schematically illustrates a main signal (data) flow and does not exclude bidirectionality. Though explicit illustration is omitted, an input port and an output port are respectively present at an input end and an output end of each connection line in each of a circuit diagram, a block diagram, an internal configuration diagram, a connection diagram, and so on given in the disclosure of the present application. The same holds true for each input/output interface.

An image processing apparatus 100 according to the one exemplary embodiment includes a request processing part 101 and a determination part 102 (see FIG. 1). The request processing part 101 processes a verification request for image data from a terminal. The determination part 102 determines whether or not the image data for which verification has been requested is restricted image data whose duplication and storage have been restricted. If the image data for which the verification has been requested is the restricted image data, the request processing part 101 instructs an apparatus that stores the image data for which the verification has been requested to delete the image data for which the verification has been requested.

The image processing apparatus 100 extracts one or more character strings from the image data, using an OCR (Optical Character Recognition: Optical Character Recognition) function, for example. The image processing apparatus 100 determines that the image data is the one whose duplication is restricted, according to whether or not a character string that characterizes an object (such as an individual number card) whose duplication has been restricted is included in these one or more extracted character strings. If the image data is the one whose duplication is restricted, as a result of the determination, the image processing apparatus 100 instructs the apparatus such as the terminal or a database server that stores a relevant image to delete the image data. On contrast with, if the duplication and so on of the image data are not restricted, the image processing apparatus 100 can permit the terminal or the like to duplicate and store the image data. As mentioned above, by the determination process with respect to the image data, the image processing apparatus 100 appropriately controls the duplication and storage of the object whose duplication and storage have been restricted.

Hereinafter, specific exemplary embodiments will be described in further detail with reference to the drawings. In the respective exemplary embodiments, the same reference numeral will be given to the same components to omit explanation thereof.

First Exemplary Embodiment

A first exemplary embodiment will be described in further detail, using the drawings.

Figure 2:
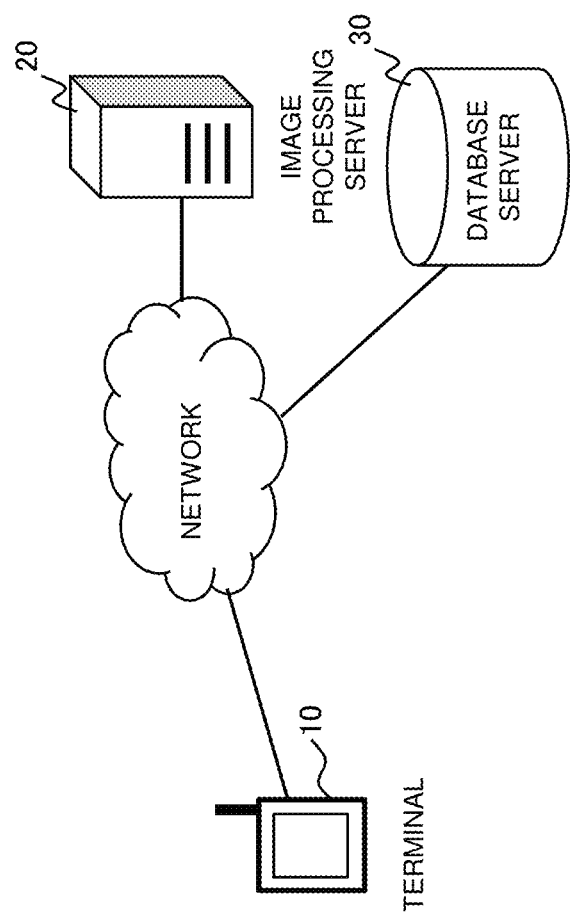
FIG. 2 is a diagram illustrating an example of a configuration of an image processing system according to a first exemplary embodiment.

FIG. 2 is a diagram illustrating an example of a configuration of an image processing system according to the first exemplary embodiment. Referring to FIG. 2, the image processing system includes a terminal 10, an image processing server 20, and a database server 30.

The terminal 10 is a terminal such as a smart phone, a cellular phone, or a tablet. The terminal 10 is an apparatus that includes a camera function, obtains image data of an object, and transmits the image data to the database server 30.

The image processing server 20 is an image processing apparatus including an OCR function. The image processing server 20 is a server that is provided by a cloud system, and the terminal 10 and the image processing server 20 are connected via a network. Though one terminal 10 is illustrated in FIG. 2, a lot of the terminals 10 actually use the image processing server 20.

The database server 30 is also a server that is provided by the cloud system and is connected to each of the terminal 10 and the image processing server 20 via the network. The database server 30 is an apparatus that stores the image data which is provided from the terminal 10.

First, an outline of operations of the image processing system will be described with reference to FIG. 2.

A user obtains image data of an object by operating the terminal 10. The terminal 10 transmits the image data to the database server 30 and stores the image data in the database server 30. The terminal 10 also transmits an image verification request including the obtained image data to the image processing server 20. The image verification request includes an identifier of an own apparatus, an identifier of the image data and authentication information of the own apparatus, in addition to the image data. In the disclosure of the present application, it is assumed that the terminal 10 is a terminal such as a smart phone that a company which provides a rental video service lends to an employee, for example. The employee (user of the terminal 10) stores data necessary for business in the database server 30 by operating the terminal 10.

The image processing server 20 verifies the obtained image data and determines whether or not the obtained image data is image data (hereinafter written as restricted image data) of the object whose duplication and storage have been restricted (hereinafter written as a restricted object). If the obtained image data is the restricted image data, the image processing server 20 determines whether or not the transmission source (user of the terminal 10) of the image data is an entity for which the duplication and the storage of the restricted object have been permitted. For that determination, the authentication information that is transmitted from the terminal 10 is used.

If the image processing server 20 has determined that the transmission source (user of the terminal 10) of the restricted image data has due authorization, the image processing server 20 transmits a "permission notification" to the terminal 10. By receipt of the notification, the terminal 10 can duplicate and store the image data for which the verification has been requested. In other words, it is not necessary to delete the image data that has been stored in each of the terminal 10 and the database server 30.

If the image processing server 20 has determined that the transmission source of the restricted image data does not have the due authorization for the duplication and the storage of the image data, the image processing server 20 transmits a "data deletion notification" to the terminal 10. The data deletion notification includes the identifier of the image data for which the verification has been requested. The terminal 10 that has received the notification identifies the image data using the identifier, and deletes the image data for which the verification has been requested from a storage medium or the like.

If the image processing server 20 has determined that the transmission source of the restricted image data does not have the due authorization for the duplication and the storage of the image data, the image processing server 20 transmits the data deletion notification to the databased server 30 as well. The database server 30 that has received the notification deletes the image data that has been specified.

Hereinafter, a description will be given about respective apparatuses for implementing functions of the above-mentioned image processing system.

[Hardware Configurations]

First, a description will be given about hardware configurations of various apparatuses comprising the image processing system according to the first exemplary embodiment.

Figure 3:
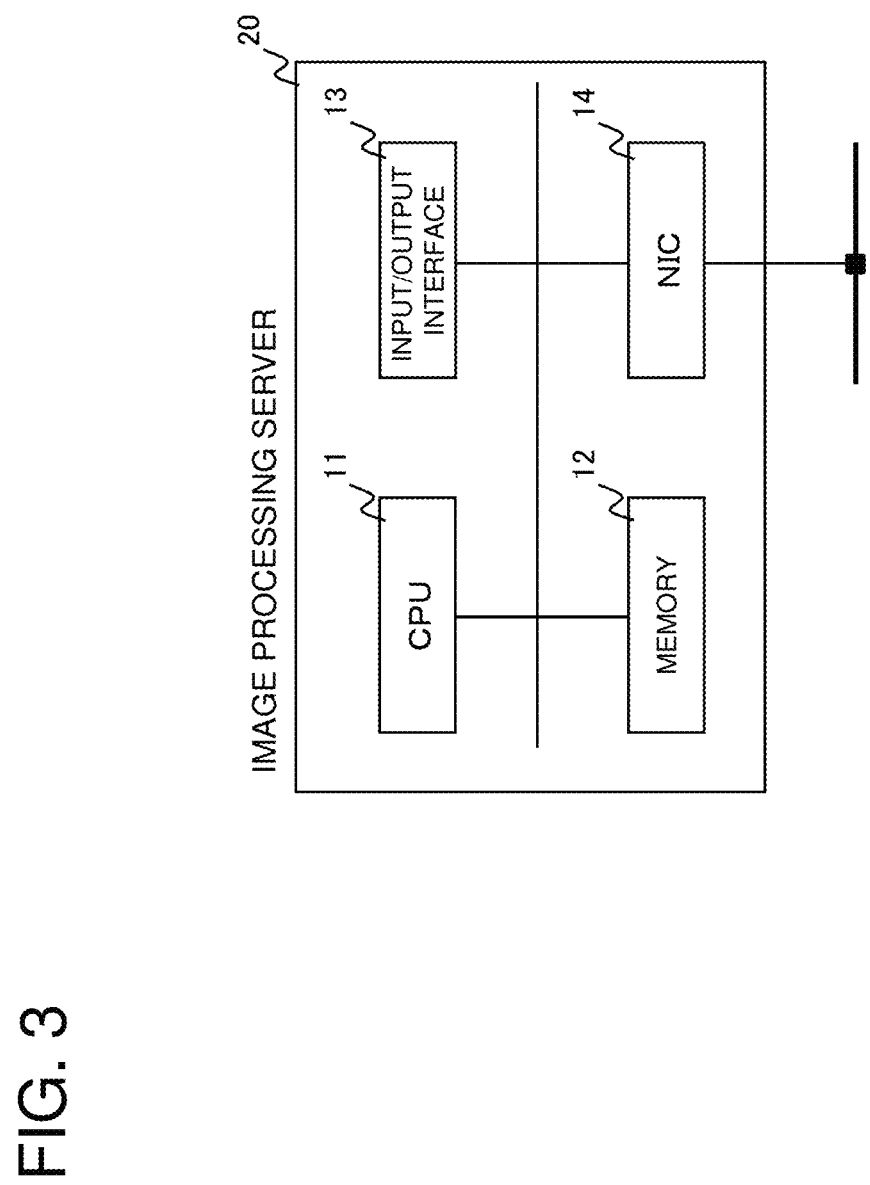
FIG. 3 is a diagram illustrating an example of a hardware configuration of an image processing server according to the first exemplary embodiment.

FIG. 3 is a diagram illustrating an example of a hardware configuration of the image processing server 20 according to the first exemplary embodiment.

The image processing server 20 can be configured with an information processing apparatus (that is a so-called computer), and includes a CPU (Central Processing Unit) 11, a memory 12, an input/output interface 13, an NIC (Network Interface Card) 14 that is a communication interface, and so on, which are mutually connected by internal buses, for example.

The configuration illustrated in FIG. 3, however, does not intend to limit the hardware configuration of the image processing server 20. The image processing server 20 may include hardware not illustrated. The number of the CPUs or the like included in the image processing server 20 is not also to be limited to the illustration in FIG. 3, and a plurality of the CPUs may be included in the image processing server 20.

The memory 12 includes one or more of RAMs (Random Access Memories), ROMs (Read Only Memories), auxiliary storage devices (such as hard disks), or the like.

The input/output interface 13 is an interface for a display device, an input device, and so on. The display device is a liquid crystal display or the like, for example. The input device is a device configured to accept a user operation for a keyboard, a mouse, or the like or a device configured to receive information from an external storage device such as a USB (Universal Serial Bus) memory. A user (such as the manager of the cloud system) inputs necessary information into the image processing server 20, using the keyboard, the mouse, or the like.

Functions of the image processing server 20 are implemented by processing modules that will be described later. The processing modules are implemented by execution of a program stored in the memory 12 by the CPU 11, for example. The program can be updated by downloading via the network or by using a storage medium that has stored a program. Further, the processing modules may be implemented by a semiconductor chip. That is, the functions to be executed by the processing modules may be implemented by some hardware and/or software.

Figure 4:
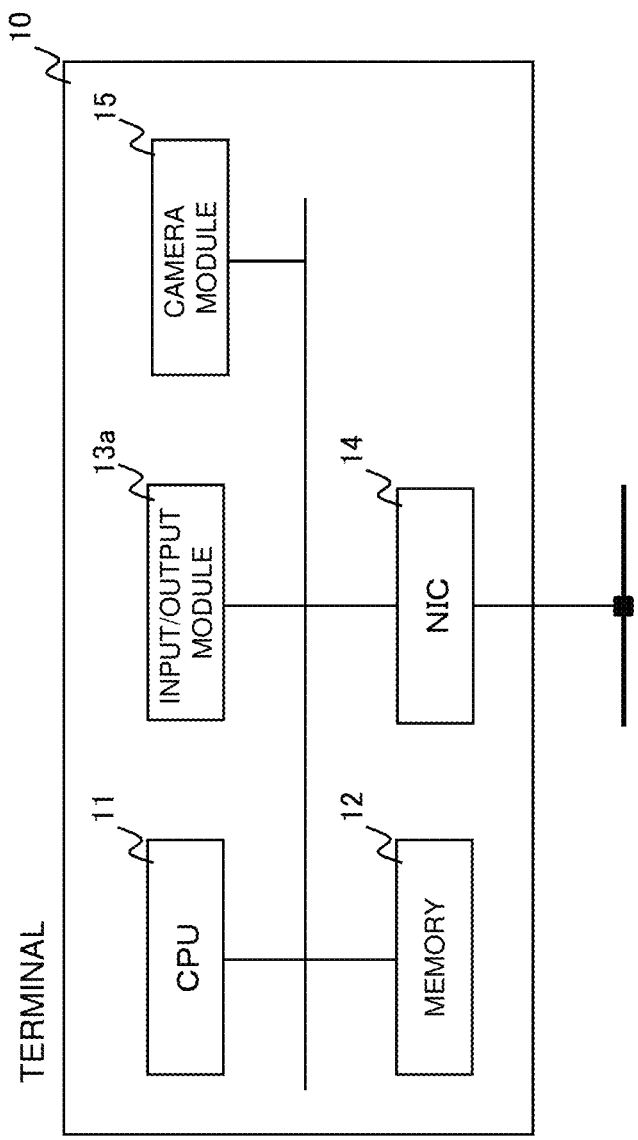
FIG. 4 is a diagram illustrating an example of a hardware configuration of a terminal according to the first exemplary embodiment.

FIG. 4 is a diagram illustrating an example of a hardware configuration of the terminal 10 according to the first exemplary embodiment. The terminal 10 includes a camera module 15, in addition to the CPU and so on that have been described above. The camera module 15 includes an imaging element such as a lens or a CCD (Charge Coupled Device) sensor, and outputs the image data of the object, using the imaging element.

An input/output module 13a is information input/output means such as a liquid crystal panel or a touch panel.

Since a hardware configuration of the database server 30 can be set to be the same as that of the image processing server 20, a description of the hardware configuration of the database server 30 will be omitted.

[Processing Modules]

Subsequently, the processing modules of the various apparatuses comprising the image processing system according to the first exemplary embodiment will be described.

Figure 5:
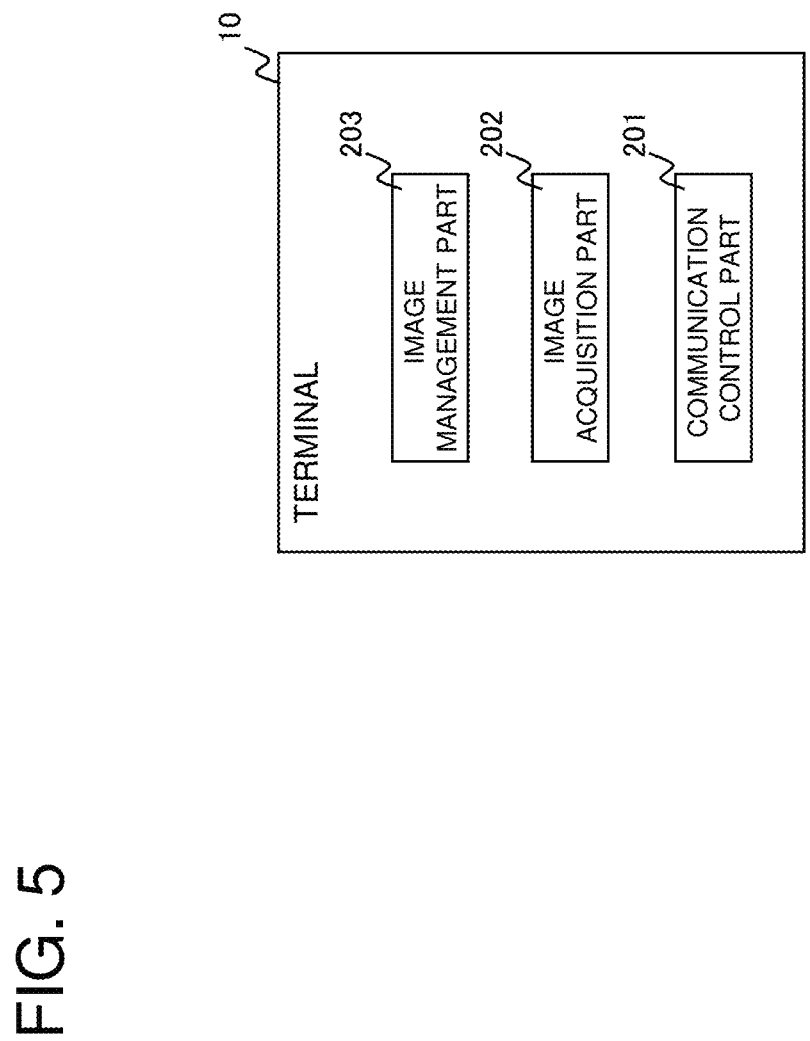
FIG. 5 is a diagram illustrating an example of a processing configuration of the terminal according to the first exemplary embodiment.

FIG. 5 is a diagram illustrating an example of a processing configuration of the terminal 10 according to the first exemplary embodiment. Referring to FIG. 5, the terminal 10 is configured by including a communication control part 201, an image acquisition part 202, and an image management part 203.

The communication control part 201 is means for controlling communication with each of the image processing server 20 and the database server 30. The communication control part 201 transmits the image data to the database server 30. The communication control part 201 transmits the image verification request including the obtained image data to the image processing server 20.

The communication control part 201 receives the data deletion notification from the image processing server 20. The communication control part 201 delivers to the image management part 203 the notification that has been obtained from the image processing server 20.

The image acquisition part 202 obtains the image data of the object for duplication by controlling the camera module 15. The image acquisition part 202 gives the identifier for the obtained image data and stores the obtained image data in the storage medium. The image acquisition part 202 transmits the obtained image data to the database server 30 and instructs the database server 30 to store the image data.

Further, the image acquisition part 202 transmits the image verification request including the image data to the image processing server 20. The image verification request includes at least the image data (entity data) for which the verification is requested, the identifier of the own apparatus (terminal 10) (such as a MAC (Media Access Control) address or an IMEI (International Mobile Equipment Identity; terminal ID)), the identifier of the image data (such as the acquisition date of the image data), and the authentication information of the user who uses the own apparatus.

A combination of an ID (Identifier) and a password is exemplified as the authentication information of the user. Alternatively, biometric information such as a fingerprint may be used as the authentication information. The authentication information is stored in the storage medium of the terminal 10 or the like, in advance.

The image management part 203 is means for managing the image data stored in the storage medium. When the image management part 203 receives the "data deletion notification" from the image processing server 20, the image management part 203 deletes the image data that has been specified by the notification from the storage medium. Preferably, if the terminal 10 has deleted the image data in response to receipt of the data deletion notification, the terminal 10 performs display informing the deletion to the user. More detailed operations of the image management part 203 will be described later with reference to FIG. 9.

[Image Processing Server]

Figure 6:
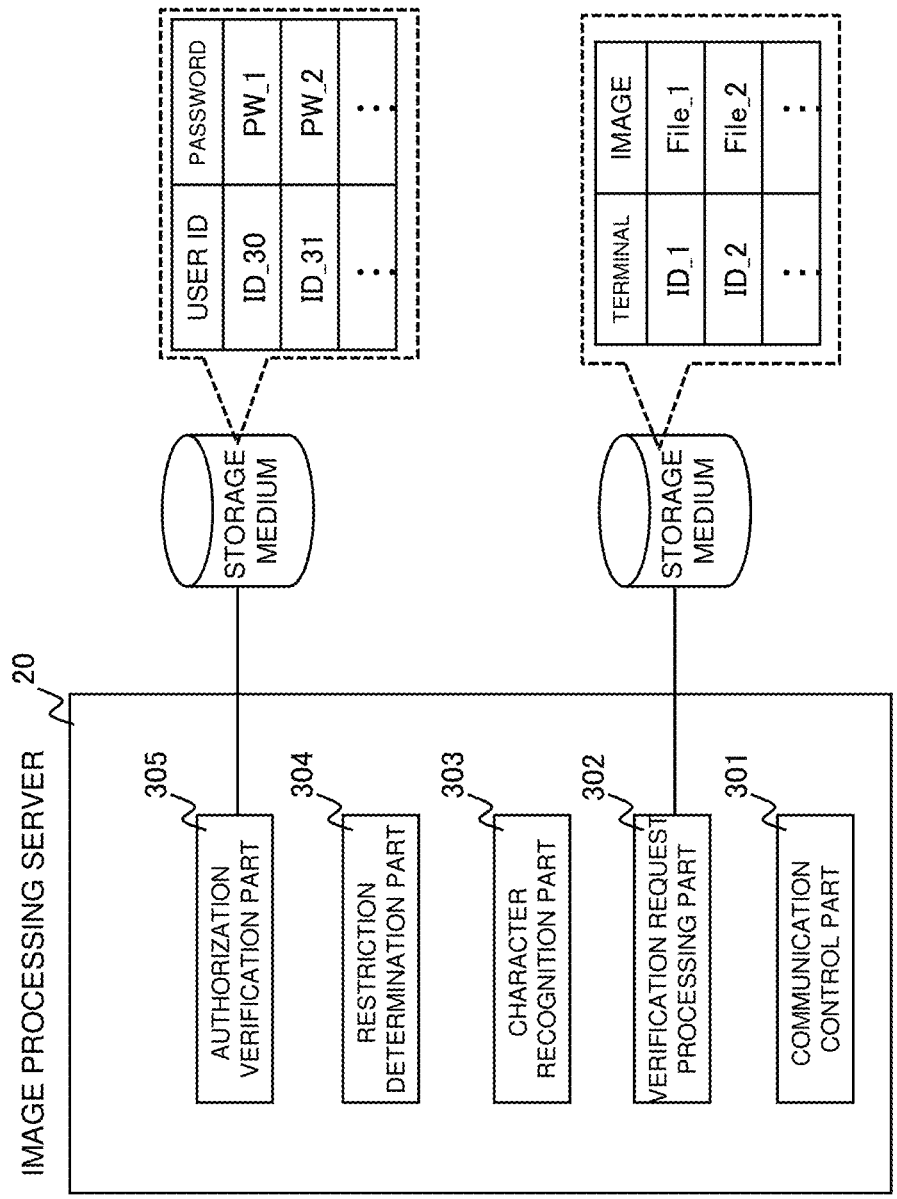
FIG. 6 is a diagram illustrating an example of a processing configuration of the image processing server according to the first exemplary embodiment.

FIG. 6 is a diagram illustrating an example of a processing configuration of the image processing server 20 according to the first exemplary embodiment. Referring to FIG. 6, the image processing server 20 is configured by including a communication control part 301, a verification request processing part 302, a character recognition part 303, a restriction determination part 304, and an authorization verification part 305.

The communication control part 301 is means for controlling communication with each of the terminal 10 and the database server 30. When the communication control part 301 receives the image verification request from the terminal 10, the communication control part 301 delivers the request to the verification request processing part 302. The communication control part 301 transmits the notification (permission notification or data deletion notification) from the verification request processing part 302 to each of the terminal 10 and the database server 30.

The verification request processing part 302 is means for processing the image verification request that has received from the terminal 10. The verification request processing part 302 stores the image verification request including the image data in the storage medium. The image verification request stored in the storage medium is configured to be accessible from a different processing module (such as the character recognition part 303).

The verification request processing part 302 associates and manages the transmission source (terminal 10) of the request and the identifier of the image data. The verification request processing part 302 instructs the character recognition part 303 to perform character recognition of the obtained image data (image data included in the image verification request).

When the character recognition by the character recognition part 303 is finished, the verification request processing part 302 instructs the restriction determination part 304 to determine whether or not the obtained image data is the restricted image data. If a result of the determination that "the image data is not the restricted image data" has been obtained, the verification request processing part 302 transmits the "permission notification" to each of the terminal 10 and the database server 30.

If a result of the determination that "the image data is the restricted image data" has been obtained, the verification request processing part 302 deletes corresponding image data stored in the storage medium. It is because the image processing server 20 does not have due authorization for storage of the restricted object. Thereafter, the verification request processing part 302 instructs the authorization verification part 305 to verify whether or not the transmission source of the image data has the due authorization for the duplication and the storage of the restricted object. If the restricted object is an individual number card, for example, it is verified whether or not the transmission source (user of the terminal 10) is a person who is prescribed by the laws and regulations.

If a result of the verification that "the transmission source has the due authorization" has been obtained, the verification request processing part 302 transmits the "permission notification" to each of the terminal 10 and the database server 30.

If a result of the verification that "the transmission source does not have the due authorization" has been obtained, the verification request processing part 302 transmits the "data deletion notification" to each of the terminal 10 and the database server 30.

Figure 7:
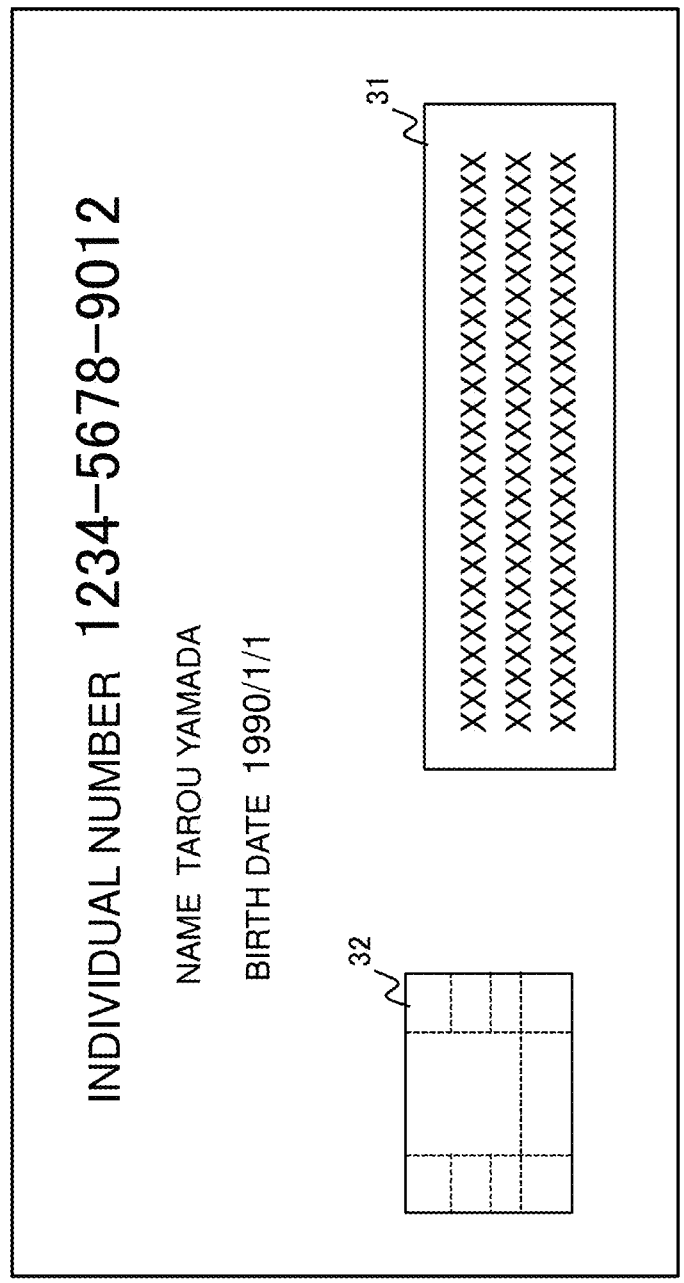
FIG. 7 is a diagram for explaining operations of the image processing server according to the first exemplary embodiment.

The character recognition part 303 is means for extracting one or more character strings from the image data. To take an example, when the one or more character strings are extracted from image data as illustrated in FIG. 7, the content of a text written in a region 31 is extracted, in addition to character strings such as an "individual number" and "1234-5678-9012". On the other hand, non-character information (non-character region) such as an IC (Integrated Circuit) chip 32 is not extracted. Preferably, when an interval between characters is shorter than a predetermined distance in the character recognition by the character recognition part 303, these characters are determined to be a lump of information (that is a character string).

The restriction determination part 304 is means for determining whether or not the image data for which the verification has been requested from the terminal 10 is the restricted image data whose duplication and storage have been restricted. Specifically, the restriction determination part 304 makes the determination about the image data for which the verification has been requested, based on the one or more character strings extracted from the image data for which the verification has been requested. To take an example, if a predetermined character string is included in the one or more character strings obtained by the character recognition part 303, the restriction determination part 304 determines the image data targeted for the determination is the restricted image data. Assume that the restricted object that is supposed by the image processing server 20 is the individual number card. Then, when the character string of the "individual number" is present in the one or more character strings extracted by the character recognition part 303, the restriction determination part 304 determines that the image data targeted for the determination is the restricted image data.

The character string to be used for that determination when the individual number card is set to the restricted object is not limited to the "individual number". To take an example, it may be determined whether or not the image data is the restricted image data by using the text written in the region 31. That is, an arbitrary character string may be used if the arbitrary character string is a character string that characterizes the individual number card.

As mentioned above, the restriction determination part 304 determines whether or not a characteristic character string that has been registered in advance (character string that characterizes the restricted object) is included in a result of the recognition by the character recognition part 303.

The authorization verification part 305 is means for verifying whether or not the user of the terminal 10 has the due authorization for the duplication of the restricted image data, using the authorization information included in the image verification request from the terminal 10. Specifically, the authorization verification part 305 refers to table information (in a database) in which each identifier (each user ID) and a password for the identifier are associated, thereby determining whether or not the identifier and the password included in the authentication information obtained from the terminal 10 are stored in the table information. The authorization verification part 305 notifies the result of the verification to the verification request processing part 302.

[Database Server]

Figure 8:
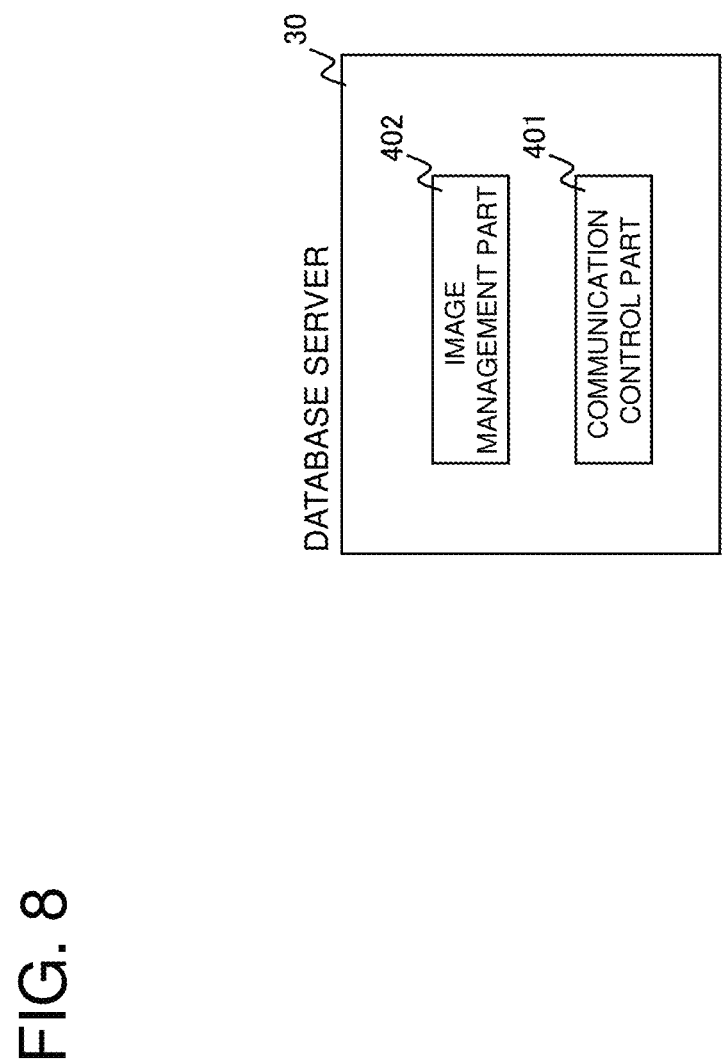
FIG. 8 is a diagram illustrating an example of a processing configuration of a database server according to the first exemplary embodiment.

FIG. 8 is a diagram illustrating an example of a processing configuration of the database server 30 according to the first exemplary embodiment. Referring to FIG. 8, the database server 30 is configured by including a communication control part 401 and an image management part 402.

The communication control part 401 is means for controlling communication with each of the terminal 10 and the image processing server 20. The communication control part 401 delivers data that has been obtained from each of the terminal 10 and the image processing server 20 to the image management part 402. When the image management part 402 obtains the image data from the terminal 10, the image management part 402 stores (stores) the image data in a storage medium together with the identifier. When the image management part 402 receives the "data deletion notification" from the image processing server 20, the image management part 402 deletes the image data specified by the notification from the storage medium. When the image management part 402 cannot receive the notification (permission notification or data deletion notification) from the image processing server 20 even if a certain period of time has passed since acquisition of the image from the terminal 10, the image management part 402 deletes the image that has been obtained from the terminal 10.

[Description of Operations]

Subsequently, operations of the terminal 10 and the image processing server 20 that comprise the image processing system will be described with reference to FIGS. 9 and 10. With regard to operations of the database server 30, the operations are as mentioned above, so that a description about the operations will be omitted.

Figure 9:
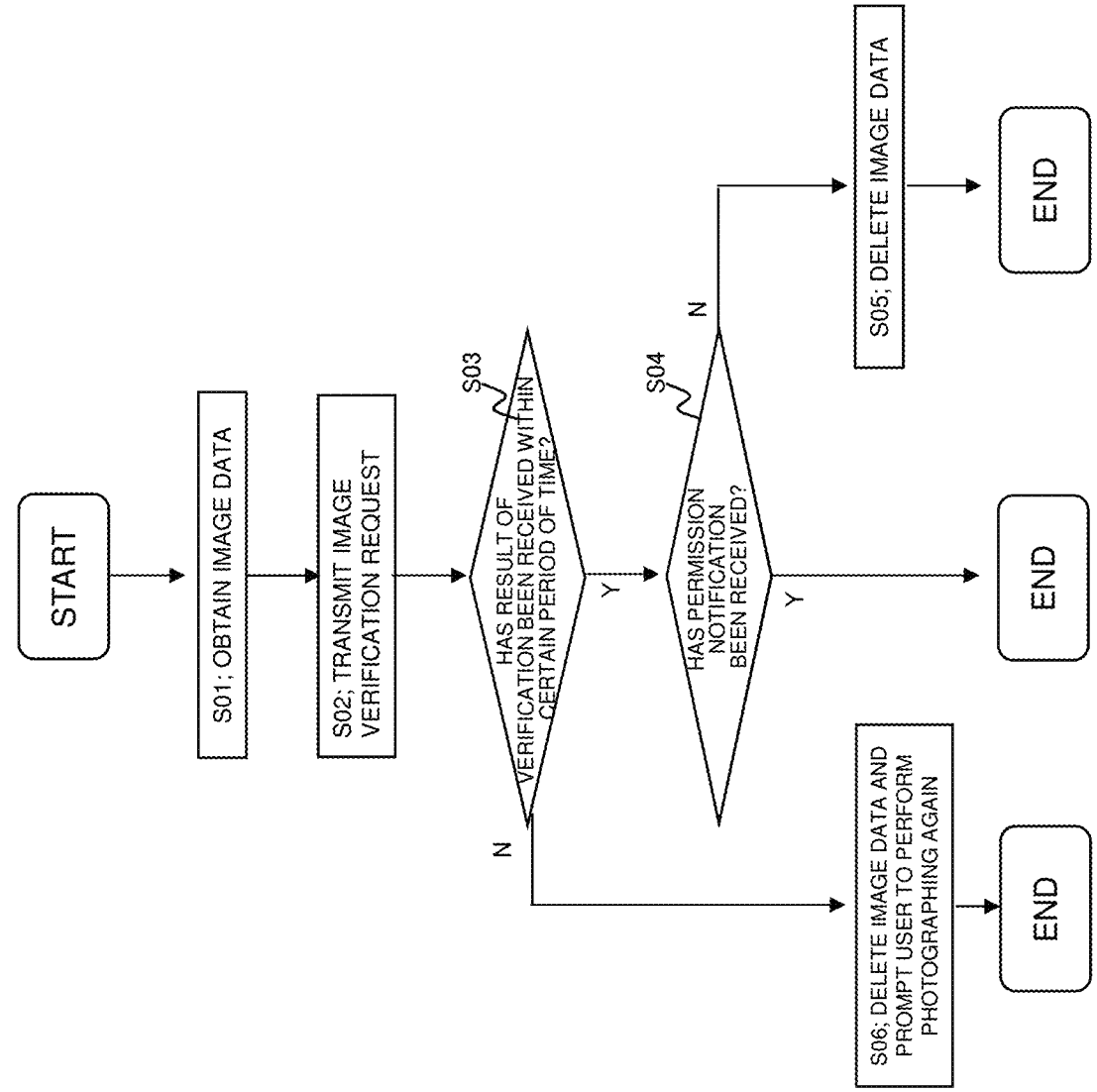
FIG. 9 is a flowchart illustrating an example of operations of the terminal according to the first exemplary embodiment.

FIG. 9 is a flowchart illustrating an example of the operations of the terminal 10 according to the first exemplary embodiment.

The terminal 10 obtains image data of an object (step S01).

The terminal 10 transmits the obtained image data to the database server 30 and transmits an image verification request for the image data to the image processing server 20 (step S02).

The terminal 10 determines whether or not the terminal 10 has received a result of verification from the image processing server 20 within a certain period of time (step S03). If the terminal 10 has received the result of the verification within the certain period of time (Y branch of step S03), the terminal 10 checks whether the result of the verification received from the image processing server 20 is a "permission notification" or a "data deletion notification" (step S04).

If the terminal 10 has received the "permission notification" from the image processing server 20 within the certain period of time (Y branch of step S03; and Y branch of step S04), the terminal 10 finishes the procedure without performing a specific operation.

If the terminal 10 has received the "data deletion notification" from the image processing server 20 within the certain period of time (Y branch of step S03; N branch of step S04), the terminal 10 deletes the image data for which the verification has been requested (step S05).

If the terminal 10 cannot receive the result of the verification from the image processing server 20 within the certain period of time (N branch of step S03), the terminal 10 deletes the image data for which the verification has been requested and prompts the user of the terminal 10 to photograph the object again (step S06). If the result of the verification cannot be obtained from the image processing server 20 within the certain period of time due to a factor such as a communication error, as mentioned above, the terminal 10 deletes the image data for which the verification has been requested. That is, it is because the terminal 10 cannot make determination as to whether the image data for which the verification has been requested may be duplicated and stored if the terminal 10 cannot receive the "permission notification" from the image processing server 20.

Figure 10:
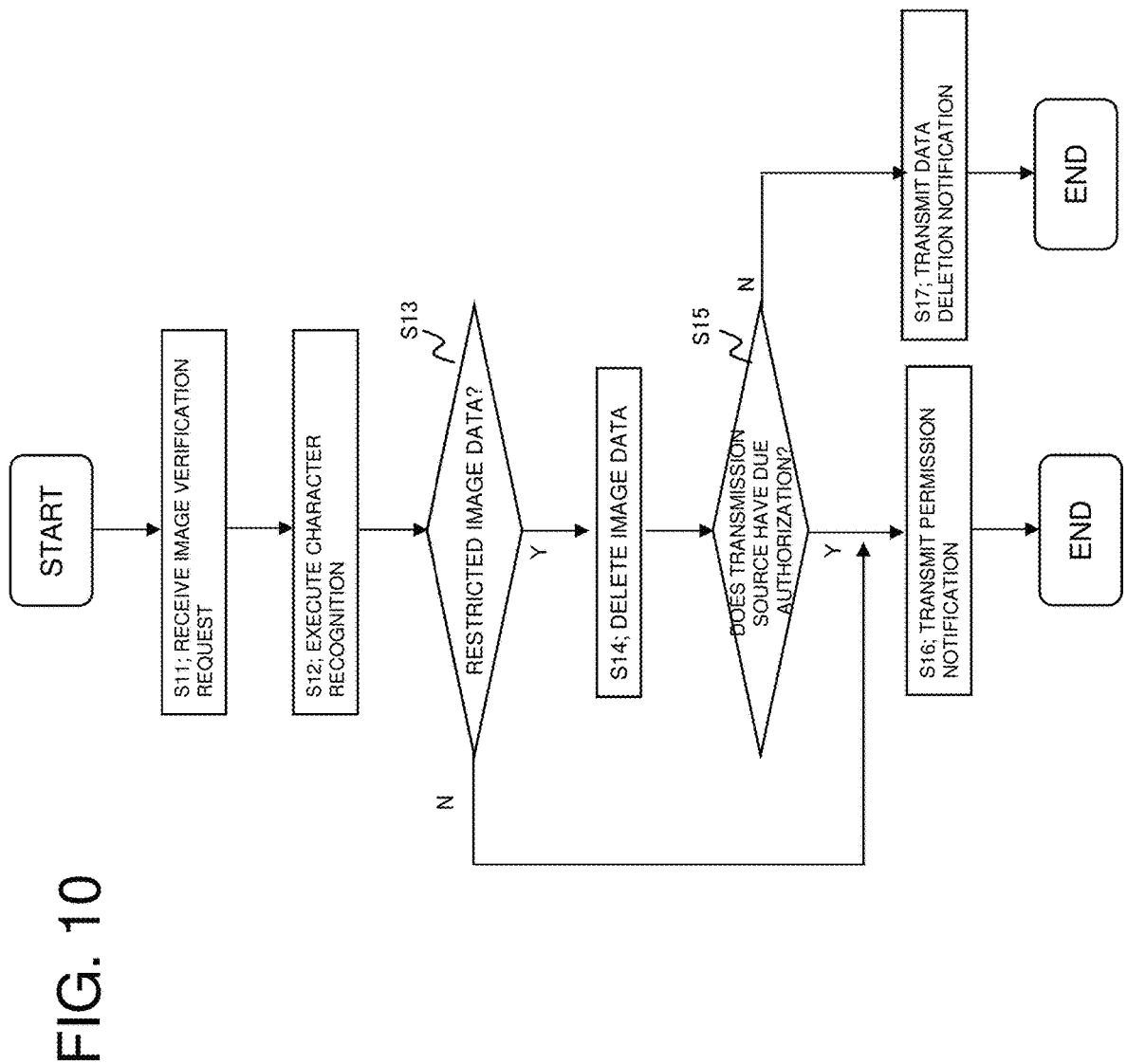
FIG. 10 is a flowchart illustrating an example of operations of the image processing server according to the first exemplary embodiment.

FIG. 10 is a flowchart illustrating an example of the operations of the image processing server 20 according to the first exemplary embodiment.

The image processing server 20 receives the image verification request from the terminal 10 (step S11).

The image processing server 20 executes character recognition of the obtained image data (step S12).

Thereafter, the image processing server 20 determines whether or not the obtained image data is restricted image data (step S13). Specifically, the image processing server 20 makes the determination according to whether or not a character string that characterizes a restricted object is included in one or more character strings that have been obtained by the character recognition.

If the image data is not the restricted image data (N branch of step S13), the image processing server 20 transmits the "permission notification" to each of the terminal 10 and the database server 30 (step S16).

If the image data is the restricted image data (Y branch of step S13), the image processing server 20 deletes the image data stored in the storage medium (step S14). Then, the image processing server 20 performs an authentication process (such as password authentication) for the transmission source (user of the terminal 10) of the image data.

If the transmission source has due authorization (Y branch of step S15), the image processing server 20 transmits the "permission notification" to each of the terminal 10 and the database server 30 (step S16).

If the transmission source does not have the due authorization (N branch of step S15), the image processing server 20 transmits the "data deletion notification" to each of the terminal 10 and the database server 30 (step S17).

As described above, in the image processing system according to the first exemplary embodiment, the character recognition process is performed for the image data for which the verification has been requested from the terminal 10. If the character string that characterizes the restricted object has been extracted from the image data as a result of the character recognition process, it is verified whether or not the transmission source of the image data has the due authentication. Only if it has been determined that the transmission source of the image data has the due authorization as a result of the verification, the duplication and the storage of the restricted object are permitted. That is, the user of the terminal 10 who has the due authorization is permitted to duplicate and storage even the restricted object. However, the duplication and the storage of the restricted object is prohibited for the user of the terminal 10 who does not have the due authorization. Thus, the duplication and the storage of the object whose duplication and storage have been restricted are appropriately controlled.

Second Exemplary Embodiment

Subsequently, a second exemplary embodiment will be described in detail with reference to the drawings.

Since a system configuration, hardware configurations and processing configurations of a terminal 10 and so on in the second exemplary embodiment can be set to be the same as those described in the first exemplary embodiment, descriptions corresponding to FIG. 2 and so on will be omitted.

In the first exemplary embodiment, it is determined that duplication and storage of image data are possible according to whether or not a character string that characterizes a restricted object is present in one or more character strings which have been obtained from the image data. In such a determination, however, it is determined that duplication and storage of every image data including a character string that characterizes a restricted object are prohibited, and according to the case, determination accuracy poses a problem (it may be determined that duplication of even an object whose duplication and so on are originally permitted is prohibited).

In the second exemplary embodiment, a description will be given about an image processing server 20 whose determination accuracy with respect to duplication-restricted image data is increased.

A restriction determination part 304 according to the second exemplary embodiment makes the determination, using positions of one or more character strings in image data recognized by a character recognition part 303 and non-character information included in the image data.

It is assumed that the character recognition part 303 according to the second exemplary embodiment not only extracts the one or more character strings but also calculates position information of the extracted one or more character strings in the image data. When the one or more character strings are extracted from the image data illustrated in FIG. 7 for example, information as illustrated in FIG. 11 is output from the character recognition part 303. Position information of each character string illustrated in FIG. 11 and the drawing after FIG. 11 is represented by a coordinate when a lower left of the image data is set to the origin of an XY coordinate system.

The restriction determination part 304 determines whether or not the image data is restricted image data by comparing each character string with the position information added thereto and reference information generated from a targeted restricted object in advance. The reference information is information in which one or more character strings that are obtained by execution of character recognition of the restricted object and respective positions of the one or more character strings are associated (see FIG. 12).

12-digit numbers of an individual number are numbers that are different for each individual number card. Accordingly, the character string of the 12-digit numbers is not suitable for comparison between two pieces of image data, so that the character string of the 12-digit numbers is excluded from the information illustrated in FIG. 12.

The restriction determination part 304 determines whether or not the image data is the restricted image data according to whether or not the position of the character string (individual number or name in FIG. 12) described in the reference information and the position of a corresponding one of the one or more character strings extracted from the image data substantially match. As mentioned above, the restriction determination part 304 according to the second exemplary embodiment determines that the image data for which verification has been requested is the restricted image data when the position of the character string, which matches the character string in the one or more character strings extracted from the image data that characterizes the object whose duplication has been restricted, is a predefined position (that is a position defined by the reference information).

Alternatively, the restriction determination part 304 may use the non-character information that is obtained from the image data for the determination about the restricted image data. To take an example, if a character string that characterizes the restricted object is included in the one or more character strings that have been extracted from the image data, the restriction determination part 304 obtains the position of the non-character information and compares the obtained information (position of the non-character information) and corresponding reference information.

In the example in FIG. 7, for example, the restriction determination part 304 extracts the IC chip 32 in the image data, using a technology such as pattern matching. If the position of the extracted IC chip 32 substantially matches a predefined position, the restriction determination part 304 may determine that the image data is the restricted object.

As described above, in the image processing system according to the second exemplary embodiment, it is determined whether or not the image data for the determination is the restricted image data, using the position information of the one or more character strings that are extracted from the image data. As a result, even if a character string that characterizes a restricted object is included in image data obtained from an object that is not the restricted object, erroneous determination about the object is prevented. That is, the determination accuracy can be more increased, in the second exemplary embodiment.

Third Exemplary Embodiment

Subsequently, a description will be given about a third exemplary embodiment in detail with reference to the drawings.

Since a system configuration, hardware configurations and processing configurations of a terminal 10 and so on in the third exemplary embodiment can be set to be the same as those described in the first and second exemplary embodiments, descriptions corresponding to FIG. 2 and so on will be omitted.

In the third exemplary embodiment, a description will be given about a case where the above-mentioned determination is made using image data other than image data that is being processed. It is premised in the third exemplary embodiment that if a restricted object is an object such as an individual number card, two pieces of image data on the front surface and the rear surface of the individual number card is often transmitted from the terminal 10 to an image processing server 20.

In the second exemplary embodiment, when the position of a specific character string in the image data matches a position that has been defined in advance as the reference information, the image data is determined to be the restricted image data. It is also assumed that a layout of characters or the like, for example, differs according to each local government that has issued a restricted object even if the restricted object is of a same type. In order to cope with such a case, reference information for each local government should be provided to perform sequential comparison. However, there is a problem such as an increase in a processing time (determination time).

Then, a restriction determination part 304 according to the third exemplary embodiment specifies necessary reference information by using one or more character strings that have been extracted from image data that was processed earlier.

Figure 13:
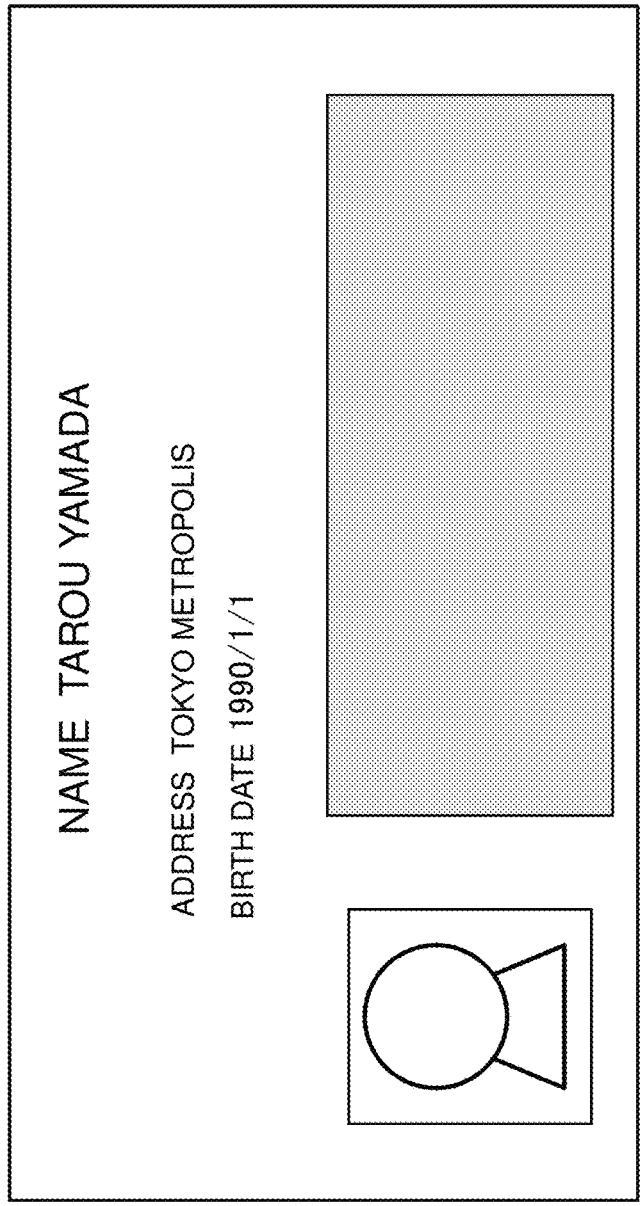
FIG. 13 includes FIG. 13A and FIG. 13B for explaining operations of an image processing server according to a third exemplary embodiment.

To take an example, it is assumed that the image processing server 20 has obtained, from the terminal 10, a verification request for image data as illustrated in FIG. 13A. In this case, character strings as illustrated in FIG. 13B are extracted by a character recognition part 303. The image processing server 20 stores the character strings as illustrated in FIG. 13B in a storage medium, in association with the transmission source of the image data that has become an extraction source of the character strings and the image data.

As described in the second exemplary embodiment, when positions of one or more character strings extracted from the image data are compared with positions described in reference information, the restriction determination part 304 retrieves, from the storage medium, image data of a same transmission source as that of the image data being processed, which has a same name and a same birth date as those of the image data being processed.

To take an example, when the image data illustrated in FIG. 7 is set to the rear surface of the individual number card and the image data illustrated in FIG. 13A is set to the front surface of the individual number card in FIG. 7, names and birth dates of both pieces of the image data match. Two pieces of image data whose names and birth dates match between the two pieces of image data are determined to be image data that become paired to each other (the front surface with respect to the rear surface or vice versa).

Then, the restriction determination part 304 obtains, from the one or more character strings extracted from the retrieved image data (image data that becomes a pair with the image data being processed) a character string corresponding to the address. In the example in FIGS. 13A-13B, "Tokyo prefecture" is obtained.

Thereafter, the restriction determination part 304 specifies, from among a plurality of pieces of reference information that have been provided in advance, reference information corresponding to the address obtained from the image data (on the front surface) that becomes the pair with the image data (on the rear surface) that is being processed. In the example in FIGS. 13A-13B, "Tokyo Metropolis" is selected from the reference information illustrated in FIG. 14 and is used for determination about duplication-restricted image data.

As described above, in the third exemplary embodiment, the determination about the image data (e.g., on the rear surface of the individual number card) for which verification has been requested from the terminal 10 is made, using the information extracted from the image data (on the associated front surface of the individual number card) that becomes the pair with the image data for which the verification has been requested. As a result, a determination result can be obtained in a short period of time even for a restricted object having a different design or layout.

Fourth Exemplary Embodiment

Subsequently, a description will be given about a fourth exemplary embodiment in detail with reference to the drawings.

In the first to third exemplary embodiments, it is assumed that the terminal 10 is the terminal such as the smart phone. A terminal to which disclosure of the present application can be applied is not limited to the smart phone or the like. To take an example, an apparatus such as a so-called copying machine may be set as the terminal 10. Consider a case where the terminal 10 (copying machine) described in each of the above-mentioned exemplary embodiments is installed in a shop that provides a rental video service, for example.

In this case, a company that provides the rental video service is not an entity for which duplication and storage of an individual number card has been permitted. Then, the rental video shop does not register authentication information in the image processing server 20 so as not to erroneously duplicate a restricted object and transmits an image verification request to the image processing server 20. As a result, even if the rear surface or the like of the individual number card is to be duplicated, a "data deletion notification" is notified from the image processing server 20, so that duplication and storage of relevant information cannot be performed.

On the other hand, among staffs of an administrative organization such as a city hall, there is a staff who can duplicate and store the individual number card. Then, authentication information of the staff or the like is registered in the image processing server 20. Then, when the staff uses the copying machine (terminal 10), he inputs the authentication information (ID and password) of himself. The terminal 10 transmits an image verification request with the input authentication information to the image processing server 20. As a result, a "permission notification" is notified from the image processing server 20, and even the rear surface of the individual number card can be duplicated and stored.

As mentioned above, the terminal 10 in each of the first to third exemplary embodiments may be the copying machine that is installed in the shop of the company or the like which provides the rental video service, for example. However, the terminal 10 may be installed in a retail shop such as a convenience store. When the terminal 10 as mentioned above uses the image processing server 20, a problem may occur. That is, the owner of an individual number card is likely to duplicate the rear surface of the individual number card using the copying machine (terminal 10) installed in the convenience store or the like. In that case, even the owner himself is not permitted to perform the duplication.

In the fourth exemplary embodiment, a description will be given about an image processing system for solving such an inconvenience.

Figure 15:
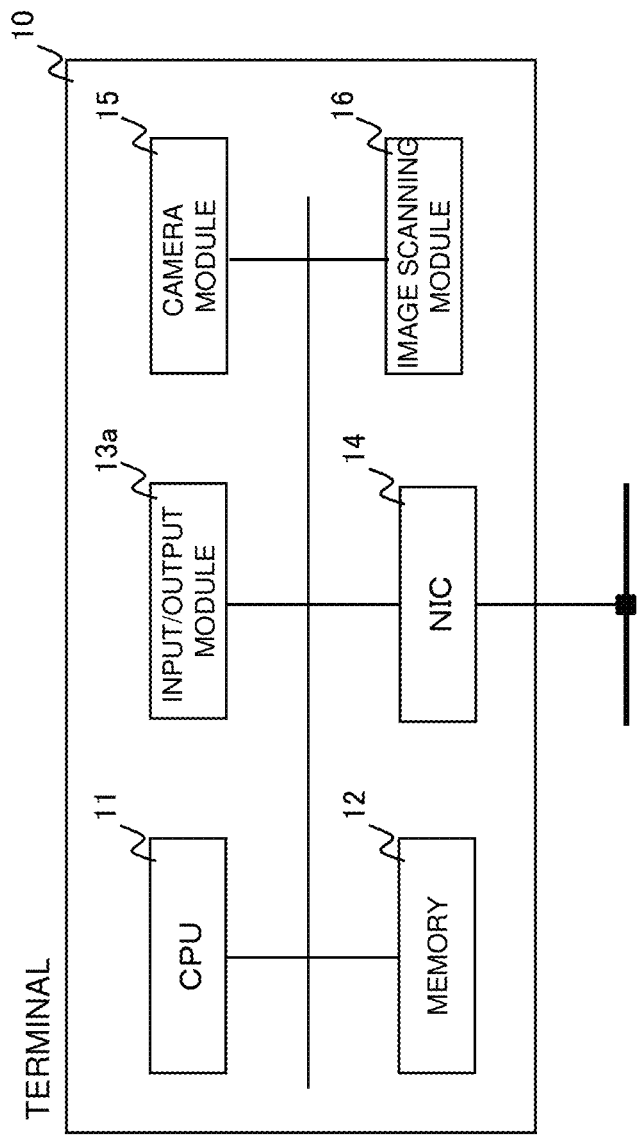
FIG. 15 is a diagram illustrating an example of a hardware configuration of a terminal according to a fourth exemplary embodiment.

FIG. 15 is a diagram illustrating an example of a hardware configuration of a terminal 10 according to the fourth exemplary embodiment. The terminal 10 according to the fourth exemplary embodiment includes an image scanning module 16. The image scanning module 16 is a so-called scanner and obtains image data of an object. In each of the first to third exemplary embodiments, image data of an object (such as an individual number card) is obtained, using the camera module 15. In the fourth exemplary embodiment, the image data of the object is obtained, using the image scanning module 16 (scanner). That is, an image acquisition part 202 controls the scanner, thereby obtaining the image data.

A lens included in a cameral module 15 of the terminal 10 according to the fourth exemplary embodiment is installed so that a face image of a person who operates the terminal 10 may be obtained.

Figure 16:
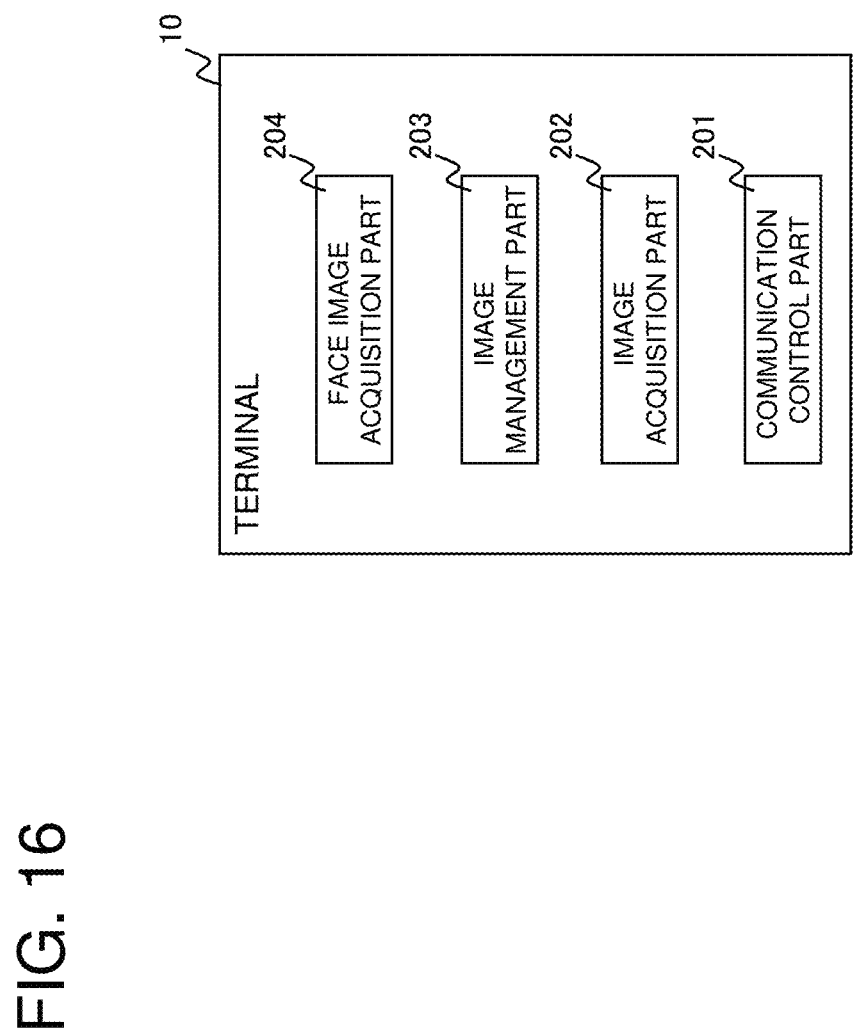
FIG. 16 is a diagram illustrating an example of a processing configuration of the terminal according to the fourth exemplary embodiment.

FIG. 16 is a diagram illustrating an example of a processing configuration of the terminal 10 according to the fourth exemplary embodiment. As illustrated in FIG. 16, the terminal 10 further includes a face image acquisition part 204. The face image acquisition part 204 controls the camera module 15, thereby obtaining a face image of a user.

The image acquisition part 202 of the terminal 10 uses the obtained face image, as authentication information when the image acquisition part 202 transmits an image verification request to an image processing server 20. That is, the image acquisition part 202 transmits, to the image processing server 20, face image data of the user as well as image data for which verification is requested.

The image processing server 20 determines whether or not to permit duplication and storage of the image data for the terminal 10 or the like, using the face image. Specifically, when a face image of a person is included restricted image data, the image processing server 20 uses the face image for authorization determination about the terminal 10. Alternatively, when a face image of a person is included in image data that becomes a pair with the restricted image data, an authorization verification part 305 uses the face image included in the image data that becomes the pair, for determination of validity.

Figure 17A:
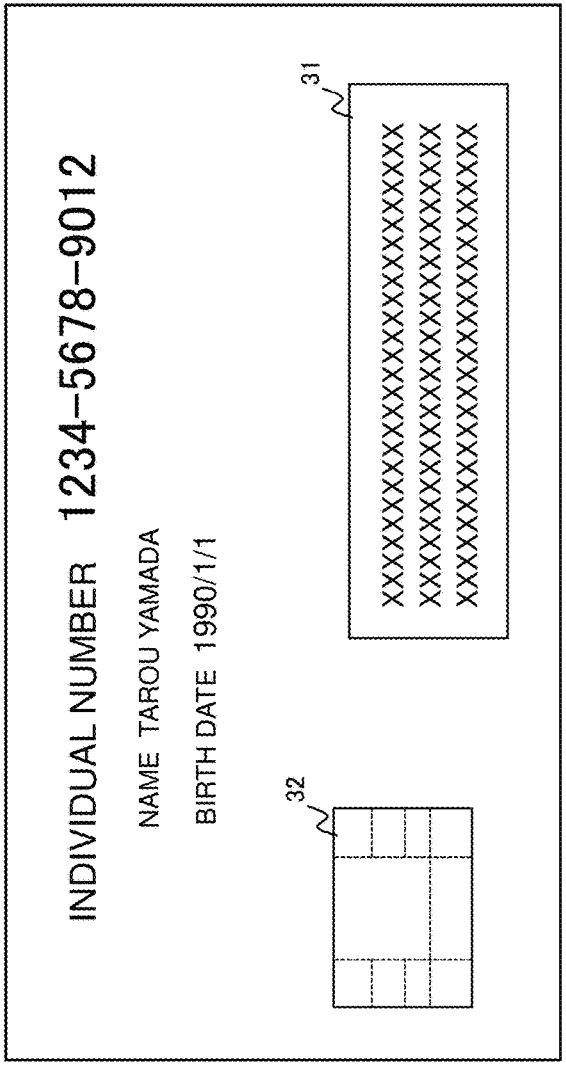
FIG. 17 includes FIG. 17A and FIG. 17B for explaining operations of an image processing server according to the fourth exemplary embodiment.
Figure 17B:
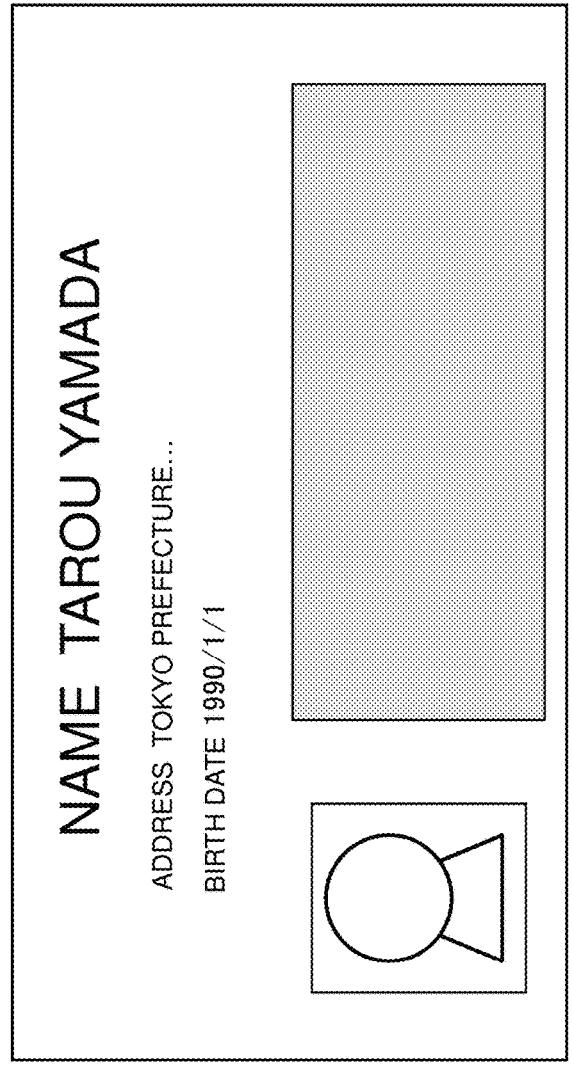

It is assumed herein that image data illustrated in FIG. 17A is the image data that is being processed and image data illustrated in FIG. 17B is the image data that becomes the pair with the image data being processed. The method described in the third exemplary embodiment can be used for identification of the image data that becomes the pair with the image data being processed. That is, using information (such as a name and a birth date) that associate two pieces of image data, the image data that becomes the pair is discovered.

The authorization verification part 305 extracts a face image from the image data that is being processed or the image data that becomes the pair. When the face image is extracted from the image data, various technologies can be used. To take an example, as disclosed in Reference Literature 1 (JP Patent Kokai Publication No. JP-P-2014-170979A), it may be so configured that an input image (image data including a face image) and a template image of each face image are compared, and the face image is extracted according to whether or not a difference between both images is equal to or less than a threshold value.

If the authorization verification part 305 has succeeded in the extraction of the face image, the authorization verification part 305 calculates a feature amount vector that characterizes each face image from each of the face image included in the authentication information and the face image extracted from the image data. With respect to the calculation of the feature amount vector from each face image, the technology that is disclosed in Reference Literature 2 (JP Patent Kokai Publication No. JP-P-2015-097000A) can be used. Specifically, feature points (such as center points and ending points of each eye, a nose, a mouth, and so on) are extracted from each face image and positional relationships of the extracted feature points, contrast values and characteristics (such as periodicity, directivity, and a color distribution) in the vicinity of the feature points are calculated as feature amounts.

The authorization verification part 305 calculates a similarity degree between the feature amount vector of the face image obtained from the terminal 10 and the feature amount vector that has been calculated from the face image extracted from the image data. To take an example, the authorization verification part 305 calculates a chi-square distance, a Euclidean distance, or the like between two feature amount vectors.

The authorization verification part 305 applies a threshold process to the calculated similarity degree, thereby determining whether or not the face image obtained from the terminal 10 as the authentication information and the face image extracted from the image data substantially match. If two face images match, the authorization verification part 305 determines that the transmission source (user of the terminal 10) of the image data being processed has due authorization for duplication of the restricted object. If the two face images do not match, the authorization verification part 305 determines that the transmission source of the image data being processed does not have the due authorization.

When the owner of the restricted object duplicates the object, the terminal 10 is determined to have the due authorization by the above-mentioned handling, so that the duplication and the storage become possible.

As described above, in the fourth exemplary embodiment, when the face image is included in the authentication information, the image processing server 20 extracts the face image from the image data for which the verification has been requested or the image data that becomes the pair with the image data for which the verification has been requested. Thereafter, the image processing server 20 verifies whether or not the terminal 10 has the due authorization for the duplication of the restricted image data, based on the face image included in the authentication information and the extracted face image. As a result, inconvenience that even a card owner cannot perform duplication is solved.

The configuration of the image processing system and so on in each of the above-mentioned exemplary embodiments are illustrations, and do not intend to limit the system configuration.

When the image processing server 20 receives an image verification request from only the terminal 10 that is installed in a shop that provides a rental video service, for example, the image processing server 20 may instruct each of the terminal 10 and the database server 30 to delete image data at a point of time when the image data for which verification has been requested is determined to be restricted image data (authentication is not necessary).

In each of the above-mentioned exemplary embodiments, the description has been given about the case where the terminal 10 stores the restricted image data in each of the storage medium of the own apparatus and the database server 30, and in that case, deletion of the restricted image data is instructed to each of the terminal 10 and the database server 30 from the image processing server 20. However, it may be so configured that the terminal 10 does not store the image data in the database server 30 and stores the image data in the storage medium of the own apparatus alone. In this case, the image processing server 20 instructs the terminal 10 to delete the restricted image data. Alternatively, it may be so configured that the terminal 10 does not store the image data in the storage medium of the own apparatus and stores the image data in the database server 30 alone. In this case, the image processing server 20 instructs the database server 30 to delete the restricted image data. As mentioned above, if the image data for which verification has been performed is the restricted image data, the image processing server 20 instructs the apparatus that stores the image data for which the verification has been requested from the terminal 10 to delete the image data.

In each of the above-mentioned exemplary embodiments, the individual number card is set to a main restricted object. The restricted object is not limited to the individual number card. The disclosure of the present application can be applied to even a different identity document.

In each of the above-mentioned exemplary embodiments, when a character string registered in advance (or the character string included in image data whose duplication is prohibited; black list) and a character string recognized by the OCR function match, deletion of an image is instructed to the terminal 10 and so on. It may be so configured, however, that when a character string registered in advance (the character string included in image data whose duplication is permitted; white list) and a character string recognized by the OCR function do not match, deletion of image data is instructed and duplication of image data other than the image data for which the permission has been made is prohibited.

In each of the above-mentioned exemplary embodiments, OCR recognition is executed by the image processing server 20 on the cloud. However, it may be so configured that the OCR recognition is executed inside the terminal 10 at a site (such as a rental video service shop), and image deletion is performed when a character string registered in advance and a character string that has been recognized match.

In each of the above-mentioned exemplary embodiments, it is so configured that image data including a character string registered in advance is deleted from the cloud (database server 30) and the terminal 10. It may also be so configured that the image processing server 20 applies an image process of filling a portion that matches the character string registered in advance, thereby not storing personal information having a problem.

In each of the above-mentioned exemplary embodiments, means for checking whether the user of the terminal 10 has authorization for duplication and storage of an image is not limited to the above-mentioned password authentication. To take an example, the authentication may be performed, using biometric information, or the authentication using a public key may be performed. Alternatively, the authentication may be performed by a combination of these pieces of the information. Further, position information of the installation location of the terminal 10 may be used for the user authentication. If the terminal 10 is an apparatus installed in an administration organization such as a city hall, for example, the position information (latitude and longitude) of the own apparatus may be included in authentication information. More specifically, the position information of the terminal 10 and the authentication information of the user of the terminal 10 are transmitted to the image processing server 20. The image processing server 20 first checks the position information of the terminal 10 and performs the authentication of the user of the terminal 10 if the position where the terminal 10 is installed is the city hall or the like. On the other hand, if the location where the terminal 10 is installed is not the city hall or the like, the image processing server 20 does not need to authorize the user of the terminal 10 without performing the authentication of the user. As mentioned above, the image processing server 20 may combine apparatus authentication and user authentication.

In plural flowcharts used in the above-mentioned description, plural steps (processes) are described in order. The execution order of the steps to be executed in each exemplary embodiment is not limited to the described order. In each exemplary embodiment, a change in the order of the steps that are illustrated, such as execution of the respective steps in parallel, can be made within the range not causing any problem in terms of contents. Matters described in each of the above-mentioned exemplary embodiments may be combined in the range consistent with the contents thereof.

A part or all of the above-mentioned exemplary embodiments can also be described as follows, but are not limited to the followings.

[First Mode]

(See the image processing apparatus according to the above-mentioned first aspect).

[Second Mode]

The image processing apparatus according to First Mode, further comprising:

a character recognition part configured to extract one or more character strings from the image data for which the verification has been requested, wherein the determination part makes the determination about the image data for which the verification has been requested, based on the one or more character strings that have been extracted from the image data for which the verification has been requested.

[Third Mode]

The image processing apparatus according to Second Mode, wherein the determination part determines that the image data for which the verification has been requested is the restricted image data when the character string that characterizes an object whose duplication and storage have been restricted is included in the one or more character strings that have been extracted.

[Fourth Mode]

The image processing apparatus according to Third Mode, wherein the determination part determines that the image data for which the verification has been requested is the restricted image data when a position of a character string, which matches the character string in the extracted one or more character strings that characterizes the object whose duplication and storage have been restricted, is a predefined position.

[Fifth Mode]

The image processing apparatus according to any one of First to Fourth Mode, wherein the determination part makes the determination about the image data for which the verification has been requested, using information that has been extracted from image data that becomes a pair with the image data for which the verification has been requested.

[Sixth Mode]

The image processing apparatus according to any one of First to Fifth Mode, wherein the verification request from the terminal includes authentication information of a user of the terminal;

the image processing apparatus further comprises a verification part configured to verify whether or not the user of the terminal has due authorization for the duplication and the storage of the restricted image data, using the authentication information; and the request processing part instructs the apparatus that stores the image data for which the verification has been requested to delete the image data for which the verification has been requested when the image data for which the verification has been requested is the restricted image data and the user of the terminal does not have the due authorization.

[Seventh Mode]

The image processing apparatus according to Sixth Mode, wherein the verification part extracts a face image from the image data for which the verification has been requested or the image data that becomes the pair with the image data for which the verification has been requested when a face image is included in the authentication information, and verifies whether or not the user of the terminal has the due authorization for the duplication and the storage of the restricted image data, based on the face image included in the authentication information and the face image that has been extracted.

[Eighth Mode]

The image processing apparatus according to any one of First to Seventh Modes, wherein when the image data for which the verification has been requested is the restricted image data, the request processing part deletes the image data for which the verification has been requested and which has been stored in an own apparatus.

[Ninth Mode]

See the image processing system according to the above-mentioned second aspect.

[Tenth Mode]

The image processing system according to Ninth Mode, wherein the image processing apparatus further includes a character recognition part configured to extract one or more character strings from the image data for which the verification has been requested; and the determination part makes the determination about the image data for which the verification has been requested, based on the one or more character strings that have been extracted from the image data for which the verification has been requested.

[Eleventh Mode]

The image processing system according to Tenth Mode, wherein the determination part determines that the image data for which the verification has been requested is the restricted image data when a character string that characterizes an object whose duplication and storage have been restricted is included in the extracted one or more character strings.

[Twelfth Mode]

The image processing system according to Eleventh Mode, wherein the determination part determines that the image data for which the verification has been requested is the restricted image data when a position of a character string, which matches the character string in the extracted one or more character strings that characterizes the object whose duplication and storage have been restricted, is a predefined position.

[Thirteenth Mode]

The image processing system according to any one of Ninth to Twelfth Modes, wherein the determination part makes the determination about the image data for which the verification has been requested, using information that has been extracted from image data that becomes a pair with the image data for which the verification has been requested.

[Fourteenth Mode]

The image processing system according to any one of Ninth to Thirteenth Modes, wherein the verification request from the terminal includes authentication information of a user of the terminal;

the image processing apparatus further includes a verification part configured to verify whether or not the user of the terminal has due authorization for the duplication and the storage of the restricted image data, using the authentication information; and the request processing part instructs each of the terminal and the database server to delete the image data for which the verification has been requested when the image data for which the verification has been requested is the restricted image data and the user of the terminal does not have the due authorization.

[Fifteenth Mode]

The image processing system according to Fourteenth Mode, wherein
the verification part extracts a face image from the image data for which the verification has been requested or the image data that becomes the pair with the image data for which the verification has been requested when a face image is included in the authentication information, and verifies whether or not the user of the terminal has the due authorization for the duplication and the storage of the restricted image data, based on the face image included in the authentication information and the face image that has been extracted.

[Sixteenth Mode]

The image processing system according to any one of Ninth to Fifteenth Modes, wherein
when the image data for which the verification has been requested is the restricted image data, the request processing part deletes the image data for which the verification has been requested and which has been stored in an own apparatus.

[Seventeenth Mode]

See the image processing method according to the above-mentioned third aspect.

[Eighteenth Mode]

See the program according to the above-mentioned fourth aspect.

Like First Mode, each of Seventeenth Mode and Eighteenth Mode can be developed into Second to Eighth Modes.

Each disclosure of the above-listed Patent Literatures and so on that have been cited is incorporated herein by reference. Modification and adjustment of each exemplary embodiment and each example are possible within the scope of the overall disclosure (including the claims) of the present invention and based on the technical concept of the present invention. Various combinations and selections of various disclosed elements (including each element in each claim, each element in each exemplary embodiment and each example, each element in each drawing, and the like) are possible within the scope of the disclosure of the present invention. That is, the present invention naturally includes various variations and modifications that could be made by those skilled in the art according to the overall disclosure including the claims and the technical concept. With respect to a numerical value range described herein in particular, an arbitrary numerical value and a small range included in the numerical value range should be construed to be specifically described even unless otherwise explicitly described.

REFERENCE SIGNS LIST 10 terminal
11 CPU
12 memory
13 input/output interface
13a input/output module
14 NIC
15 camera module
16 image scanning module
20 image processing server
30 database server
31 region
32 IC chip
100 image processing apparatus
101 request processing part
102 determination part
201, 301, 401 communication control part
202 image acquisition part
203, 402 image management part
204 face image acquisition part
302 verification request processing part
303 character recognition part
304 restriction determination part
305 authorization verification part

The invention claimed is:

1. An image processing apparatus, comprising:
at least one memory configured to store instructions; and
at least one processor configured to execute the instructions, to perform:
obtaining a verification request for image data from a user terminal;
extracting one or more character strings from the image data for which the verification has been requested;
determining that the image data for which verification has been requested is restricted image data whose duplication and storage have been restricted when the character string that characterizes an object whose duplication and storage have been restricted is included in the one or more character strings;
verifying whether or not the user of the user terminal has due authorization for the duplication and the storage of the restricted image data, using authentication information of a user of the user terminal included in the verification request; and
instructing the user terminal that stores the image data for which the verification has been requested to delete the image data for which the verification has been requested when the image data for which the verification has been requested is the restricted image data and the user of the user terminal does not have the due authorization.

2. The image processing apparatus according to claim 1, the instructions further comprising:
determining that the image data for which the verification has been requested is the restricted image data when a position of a character string, which matches the character string in the extracted one or more character strings that characterizes the object whose duplication and storage have been restricted, is a predefined position.

3. The image processing apparatus according claim 1, the instructions further comprising:
making a determination about the image data for which the verification has been requested, using information that has been extracted from image data that becomes a pair with the image data for which the verification has been requested.

4. The image processing apparatus according to claim 1, the instructions further comprising:
extracting a face image from the image data for which the verification has been requested or the image data that becomes the pair with the image data for which the verification has been requested when a face image is included in the authentication information; and
verifying whether or not the user of the user terminal has the due authorization for the duplication and the storage of the restricted image data, based on the face image included in the authentication information and the face image that has been extracted.

5. The image processing apparatus according to claim 1, the instructions further comprising:
deleting the image data for which the verification has been requested and which has been stored in the image processing apparatus when the image data for which the verification has been requested is the restricted image data.

6. An image processing method comprising:
- obtaining a verification request for image data from a user terminal;
- extracting one or more character strings from the image data for which the verification has been requested;
- determining that the image data for which verification has been requested is restricted image data whose duplication and storage have been restricted when the character string that characterizes an object whose duplication and storage have been restricted is included in the one or more character strings;
- verifying whether or not the user of the user terminal has due authorization for the duplication and the storage of the restricted image data, using authentication information of a user of the user terminal included in the verification request; and
- instructing the user terminal that stores the image data for which the verification has been requested to delete the image data for which the verification has been requested when the image data for which the verification has been requested is the restricted image data and the user of the user terminal does not have the due authorization.

7. The image processing method according to claim 6, further comprising:
- determining that the image data for which the verification has been requested is the restricted image data when a position of a character string, which matches the character string in the extracted one or more character strings that characterizes the object whose duplication and storage have been restricted, is a predefined position.

8. The image processing method according claim 6, further comprising:
- making a determination about the image data for which the verification has been requested, using information that has been extracted from image data that becomes a pair with the image data for which the verification has been requested.

9. A non-transitory computer-readable storage medium storing a program configured to cause a computer to execute processes of:
- obtaining a verification request for image data from a user terminal;
- determining that the image data for which verification has been requested is restricted image data whose duplication and storage have been restricted when the character string that characterizes an object whose duplication and storage have been restricted is included in the one or more character strings;
- verifying whether or not the user of the user terminal has due authorization for the duplication and the storage of the restricted image data, using authentication information of a user of the user terminal included in the verification request; and
- instructing the user terminal that stores the image data for which the verification has been requested to delete the image data for which the verification has been requested when the image data for which the verification has been requested is the restricted image data and the user of the user terminal does not have the due authorization.

10. The non-transitory computer-readable storage medium storing the program according to claim 9, further comprising processes of:
- determining that the image data for which the verification has been requested is the restricted image data when a position of a character string, which matches the character string in the extracted one or more character strings that characterizes the object whose duplication and storage have been restricted, is a predefined position.

11. The non-transitory computer-readable storage medium storing the program according to claim 9, further comprising processes of:
- making a determination about the image data for which the verification has been requested, using information that has been extracted from image data that becomes a pair with the image data for which the verification has been requested.

* * * * *